(12) United States Patent
Hochstetter et al.

(10) Patent No.: US 10,240,016 B2
(45) Date of Patent: Mar. 26, 2019

(54) METHOD FOR A COMPOSITE MATERIAL IMPREGNATED WITH THERMOPLASTIC POLYMER, OBTAINED FROM A PREPOLYMER AND A CHAIN EXTENDER

(71) Applicant: Arkema France, Colombes (FR)

(72) Inventors: Gilles Hochstetter, L'hay les Roses (FR); Thierry Briffaud, Bernay (FR); Mathieu Capelot, Bernay (FR)

(73) Assignee: ARKEMA FRANCE, Colombes (FR)

( * ) Notice: Subject to any disclaimer, the term of this patent is extended or adjusted under 35 U.S.C. 154(b) by 253 days.

(21) Appl. No.: 15/304,657

(22) PCT Filed: Apr. 15, 2015

(86) PCT No.: PCT/FR2015/051018
§ 371 (c)(1),
(2) Date: Oct. 17, 2016

(87) PCT Pub. No.: WO2015/159021
PCT Pub. Date: Oct. 22, 2015

(65) Prior Publication Data
US 2017/0037208 A1    Feb. 9, 2017

(30) Foreign Application Priority Data
Apr. 15, 2014  (FR) ..................................... 14 53352

(51) Int. Cl.
| | | |
|---|---|---|
| *C08J 5/24* | (2006.01) | |
| *C08J 5/04* | (2006.01) | |
| *C08G 69/48* | (2006.01) | |
| *C08G 69/44* | (2006.01) | |
| *C08K 5/353* | (2006.01) | |
| *B29C 45/00* | (2006.01) | |
| *C08G 69/26* | (2006.01) | |
| *C08G 69/32* | (2006.01) | |
| *C08J 5/10* | (2006.01) | |
| *B29K 77/00* | (2006.01) | |
| *B29L 31/00* | (2006.01) | |

(52) U.S. Cl.
CPC .............. *C08J 5/24* (2013.01); *B29C 45/0005* (2013.01); *C08G 69/265* (2013.01); *C08G 69/32* (2013.01); *C08G 69/44* (2013.01); *C08G 69/48* (2013.01); *C08J 5/04* (2013.01); *C08J 5/10* (2013.01); *C08K 5/353* (2013.01); *B29K 2077/00* (2013.01); *B29L 2031/00* (2013.01); *C08J 2377/06* (2013.01); *C08J 2377/10* (2013.01); *C08J 2377/12* (2013.01)

(58) Field of Classification Search
None
See application file for complete search history.

(56) References Cited

U.S. PATENT DOCUMENTS

| | | | |
|---|---|---|---|
| 3,696,074 | A | 10/1972 | Tsuda et al. |
| 4,927,583 | A | 5/1990 | Lottiau et al. |
| 5,047,263 | A | 9/1991 | Glemet |
| 5,138,021 | A | 8/1992 | Judas et al. |
| 5,254,620 | A | 10/1993 | Goetz et al. |
| 5,391,572 | A | 2/1995 | Goetz et al. |
| 5,422,418 | A | 6/1995 | Maj et al. |
| 5,665,855 | A | 9/1997 | Acevedo et al. |
| 5,807,966 | A | 9/1998 | Pfaendner et al. |
| 6,130,312 | A | 10/2000 | Murakami et al. |
| 7,592,558 | B2 | 9/2009 | Lima |
| 7,892,455 | B2 | 2/2011 | Bradley et al. |
| 7,927,710 | B2 | 4/2011 | Hewel |
| 8,871,862 | B2 | 10/2014 | Pawlik et al. |
| 9,139,707 | B2 * | 9/2015 | Hochstetter ................ C08J 5/24 |
| 9,752,029 | B2 | 9/2017 | Briffaud et al. |
| 10,000,662 | B2 * | 6/2018 | Hochstetter ............. B29C 70/52 |
| 2007/0148389 | A1 | 6/2007 | Nishioka et al. |
| 2008/0020219 | A1 | 1/2008 | Bouquerel et al. |

(Continued)

FOREIGN PATENT DOCUMENTS

| | | |
|---|---|---|
| CN | 102 234 373 A | 11/2001 |
| EP | 0 201 367 A1 | 11/1986 |

(Continued)

OTHER PUBLICATIONS

International Search Report (PCT/ISA/210) dated Aug. 28, 2015, by the European Patent Office as the International Searching Authority for International Application No. PCT/FR2015/051018.
Written Opinion (PCT/ISA/237) dated Aug. 28, 2015, by the European Patent Office as the International Searching Authority for International Application No. PCT/FR2015/051018.
J.G. Dolden, "Structure-property relationships in amorphous polyamides," Polymer, Oct. 1976, pp. 875-892, vol. 17, Elsevier Science Publishers B.V., Great Britain.
Chengxiang Lu et al., "Chain Extension of Polyamide 6 Using Bisoxazoline Coupling Agents," Journal of Macromolecular Science, Part B: Physics, Jan. 2008, pp. 986-999, vol. 47, Taylor & Francis Group, LLC.
Kroschwitz, Jacqueline I., Executive Editor, "Cycloaliphatic Amines", Kirk-Othmer Encyclopedia of Chemical Technology, $4^{th}$ Edition, 1992, pp. 386-405, vol. 2, John Wiley & Sons, Inc., New York, USA (24 pages).

(Continued)

*Primary Examiner* — Robert B Davis
(74) *Attorney, Agent, or Firm* — Buchanan Ingersoll & Rooney P.C.

(57) ABSTRACT

A process for a composite material, including an assembly of one or more reinforcing fibers, impregnated with at least one thermoplastic polymer with a glass transition temperature Tg of less than or equal to 75° C. and a melting point of from 150° C. to less than 250° C. or a Tg of greater than 75° C., the process including: i) a step of impregnating said assembly in bulk melt form with at least one thermoplastic polymer, which is the product of polymerization by polyaddition reaction of a reactive precursor composition including: a) at least one prepolymer P(X)n of said thermoplastic polymer, and b) at least one chain extender, represented by Y-A-Y, ii) a step of cooling and obtaining a fibrous preimpregnate, and iii) a step of processing and final forming of said composite material.

25 Claims, 1 Drawing Sheet

(56) References Cited

U.S. PATENT DOCUMENTS

| | | |
|---|---|---|
| 2008/0274355 A1 | 11/2008 | Hewel |
| 2009/0062452 A1 | 3/2009 | Harder et al. |
| 2009/0105392 A1 | 4/2009 | Yamauchi et al. |
| 2010/0215920 A1 | 8/2010 | Orange et al. |
| 2011/0052848 A1 | 3/2011 | Doshi et al. |
| 2011/0123749 A1 | 5/2011 | Hewel et al. |
| 2011/0241249 A1 | 10/2011 | Orange et al. |
| 2011/0306718 A1 | 12/2011 | Scherzer et al. |
| 2012/0022194 A1 | 1/2012 | Bayer et al. |
| 2012/0095161 A1 | 4/2012 | Pawlik et al. |
| 2012/0202896 A1 | 8/2012 | Blondel et al. |
| 2012/0321829 A1 | 12/2012 | Bayer et al. |
| 2013/0131269 A1 | 5/2013 | Davezac et al. |
| 2013/0225770 A1 | 8/2013 | Jang et al. |
| 2013/0338260 A1 | 12/2013 | Center et al. |
| 2013/0338261 A1 | 12/2013 | Center et al. |
| 2014/0194570 A1 | 7/2014 | Kato et al. |
| 2014/0316063 A1 | 10/2014 | Hochstetter et al. |
| 2015/0126646 A1 | 5/2015 | Hochstetter et al. |
| 2015/0258742 A1 | 9/2015 | Hochstetter et al. |
| 2015/0267050 A1 | 9/2015 | Briffaud et al. |
| 2017/0037185 A1 | 2/2017 | Briffaud et al. |
| 2017/0037186 A1 | 2/2017 | Hochstetter et al. |
| 2017/0037199 A1 | 2/2017 | Hochstetter et al. |
| 2017/0037204 A1 | 2/2017 | Briffaud et al. |
| 2017/0044317 A1 | 2/2017 | Briffaud et al. |
| 2017/0335107 A1 | 11/2017 | Briffaud et al. |
| 2018/0223057 A1 | 8/2018 | Capelot et al. |

FOREIGN PATENT DOCUMENTS

| | | |
|---|---|---|
| EP | 0 261 020 A1 | 3/1988 |
| EP | 0 425 341 A1 | 5/1991 |
| EP | 0 471 566 A1 | 2/1992 |
| EP | 0 550 314 A1 | 7/1993 |
| EP | 0 581 641 A1 | 2/1994 |
| EP | 0 581 642 A1 | 2/1994 |
| EP | 0 739 924 A1 | 10/1996 |
| EP | 2 386 397 A1 | 11/2001 |
| EP | 1 266 930 A1 | 12/2002 |
| EP | 1 741 553 A1 | 1/2007 |
| EP | 1 988 113 A1 | 11/2008 |
| EP | 2 325 260 A1 | 5/2011 |
| EP | 2 535 365 A1 | 12/2012 |
| EP | 2 586 585 A1 | 5/2013 |
| FR | 2 603 891 A1 | 3/1988 |
| FR | 2 936 441 A1 | 4/2010 |
| FR | 2 958 296 A1 | 10/2011 |
| FR | 2 997 036 A1 | 4/2014 |
| FR | 2 997 089 A1 | 4/2014 |
| JP | 2006-274061 A | 10/2006 |
| KR | 2008 0032357 A | 4/2008 |
| WO | WO 03/014198 A1 | 2/2003 |
| WO | WO 2005/061209 A1 | 7/2005 |
| WO | WO 2011/003973 A2 | 1/2011 |
| WO | WO 2011/015790 A2 | 2/2011 |
| WO | WO 2013/060976 A1 | 5/2013 |
| WO | WO 2013/178955 A1 | 12/2013 |
| WO | WO 2014/064375 A1 | 5/2014 |
| WO | WO 2015/159015 A1 | 10/2015 |

OTHER PUBLICATIONS

Chengxiang, Lu, et al., "Chemical Modification of Polyamide-6 by Chain Extension with 2,2'-Bis(2-oxazoline)," Journal of Polymer Science, Part B: Polymer Physics, Jan. 1, 2007, pp. 1976-1982, vol. 45, No. 15, Taylor & Francis Group, LLC, XP055163146.

Koubaa, et al., "Thermoplastic pultrusion process: Modeling and optimal conditions for fibers impregnation," Journal of Reinforced Plastics & Composites, 32(17):1285-94 (2013).

\* cited by examiner

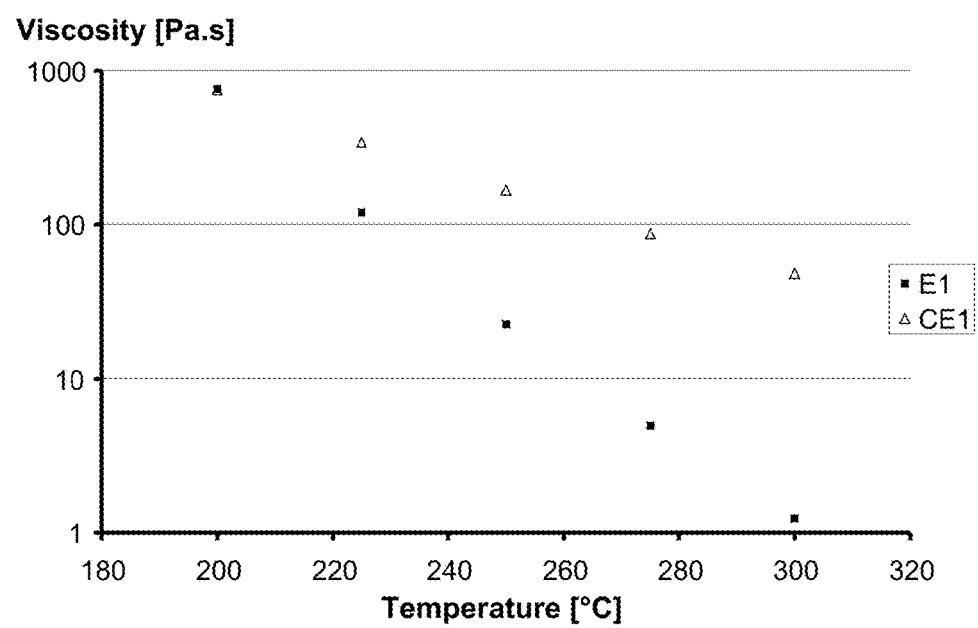
Evolution of viscosities from tests E1 and CE1 (PA 11) in relation to temperature

METHOD FOR A COMPOSITE MATERIAL IMPREGNATED WITH THERMOPLASTIC POLYMER, OBTAINED FROM A PREPOLYMER AND A CHAIN EXTENDER

The present invention relates to a specific process for manufacturing a thermoplastic composite material, comprising the impregnation of an assembly of one or more reinforcing fibers with at least one specific polymer in bulk melt form, said polymer being the product of polymerization by polyaddition reaction of a precursor reactive composition based on a prepolymer of said polymer and on a non-polymeric chain extender that is reactive with said prepolymer. The invention relates in particular to the use of said non-reactive polymer as an impregnation binder in bulk melt form for said fibrous assembly, for the manufacture of a thermoplastic composite material in which said polymer is the thermoplastic matrix. More particularly, this use relates to mechanical or structural molded parts based on said composite material for lighter parts made of composite material with sufficient mechanical performance qualities, in particular for replacing metal in various fields of application such as the aeronautics, motor vehicle, railway, road transport, wind power, photovoltaic, nautical and naval construction, sports and leisure, construction or civil engineering fields.

Composite materials and more particularly composite materials comprising reinforcing fibers impregnated with a polymer matrix are used in many technical fields, in particular in aeronautical, aerospace, wind power, motor vehicle, railway and marine applications. These applications mainly require composites with high mechanical performance qualities, in particular for certain applications at high working temperatures.

Composites, with a matrix based on thermosetting polymers, occupy a predominant place in these markets by virtue of the processes for manufacturing same and their ease of processing. These materials are increasingly used for lightening structures, for example in aeronautics and in motor vehicles. However, thermosetting polymers cannot satisfy increasingly stringent requirements that come to bear on constructors, which are limiting constraints for these materials, in particular for motor vehicles as regards: reducing the cycle times, reducing the energy consumption and the recyclability of the materials used. As other drawbacks of these materials, mention may be made of the toxicity of some of the components thereof and the emission of volatile organic compounds, for example monomers such as styrene, during their handling and use, thus necessitating special protections and/or conditions for handling and processing. An additional drawback of thermosetting materials is the volume shrinkage after firing, which affects the size stability and the surface appearance after molding, which demands a special treatment.

Also, thermoplastic polymers which have the advantage of being readily recyclable and which are, in the case of polyamides, lighter than thermosetting polymers, offer new perspectives in the field of composites as polymer matrix. However, the current processes for manufacturing composites with a thermoplastic matrix are more constraining than those using thermosetting materials, and, as a result, the quality of the manufactured composite is not always optimal. The essential limiting factor for the use of a thermoplastic composite is the viscosity of the thermoplastic polymer that will be used as matrix, impregnating the fibrous substrate. In general, even in melt form, this viscosity remains high and thus makes the impregnation of the fibrous substrate more difficult than a liquid resin, for instance a thermosetting resin based on unsaturated polyester or vinyl ester.

The polymer matrix must first have good impregnation of the reinforcing fibers so as to allow the transmission to the reinforcing fibers of the mechanical stresses to which the composite material is subjected, thus with a more efficient response of said composite material to the mechanical stress. Next, coating of said reinforcing fibers with this matrix affords these fibers chemical protection. In particular, in order for a thermoplastic-matrix composite to have good mechanical properties for the final use, especially in terms of impact strength, it is necessary for the molecular mass of the thermoplastic polymer of the matrix to be as high as possible. On the other hand, this high mass characteristic is generally reflected for the thermoplastic polymers of the prior art, during the manufacture of the composite, by a high melt viscosity of the thermoplastic polymer of the matrix. This high viscosity thus poses serious difficulties for achieving suitable impregnation of the fibers: thus, the composite obtained may have impregnation defects with microvoids created, which are liable to bring about mechanical deficiencies, in particular delamination of the fibers, and to embrittle the final composite material.

Various solutions are known for overcoming the problem of fiber impregnation. It is possible, for example, to perform the impregnation of said fibers at a higher pressure or temperature and/or to lengthen the impregnation time. These solutions are unsatisfactory since, under the effect of the pressure, the fibers may be locally disorientated, bringing about a loss of properties of the composite, or, under the effect of a higher temperature, the polymer matrix may degrade thermally, having a detrimental effect on the final mechanical performance qualities. Moreover, increasing the impregnation time to compensate for the high viscosity of the thermoplastic resin proves to be too long to be compatible with mass production of parts. Moreover, equipment functioning at high pressure is incompatible with the production of large-sized parts due to the cost of such equipment.

Another approach for facilitating fiber impregnation consists in acting on the fiber-matrix interface. Patent EP 0 201 367 thus proposes a fiber-reinforced thermoplastic polymer composite material in which the bond between the polymer and the fibers is provided by a second low-viscosity thermoplastic polymer that promotes the wetting of the fibers. This solution is not easy to implement, since, not only does it require the presence of a second polymer, but also this second polymer needs to have a good capacity for wetting the fibers and also needs to have good compatibility with the main polymer. In addition, this polymer may constitute a weak point due to its low molecular mass and/or its low thermal strength at low Tg and low melting point.

Moreover, FR 2 936 441 describes the use as a thermoplastic matrix of a low molecular weight polyamide "resin", with Mw ranging from 5000 to 25 000 and non-evolutive, for impregnating a reinforcing material for a composite article. The polyamide resin has as specificity a content of amine or carboxyl end groups not exceeding 20 meq./kg, corresponding essentially to polyamides containing only amine or carboxyl end functions. This moreover explains the absence of increase or of evolutivity of the molecular masses of these polyamides, which is their essential characteristic. The resin is presented as fluid in the melt form to impregnate the reinforcing material. However, the limitation of the molecular mass of said polymers already limits their application performance.

FR 2 603 891 describes a process for manufacturing a composite material, constituted by a polyamide matrix reinforced with long reinforcing fibers. These fibers are impregnated with a polyamide prepolymer or oligomer which comprises reactive end functions that are capable of reacting together under the effect of heating, bringing about lengthening of the polymer chain. The oligomer or prepolymer has a low molecular mass. The reactive functions described in said document react via condensation with, as a consequence, the formation of volatile condensation byproducts such as water, which, failing their removal, may affect the mechanical performance qualities of the parts obtained due to the presence of bubbles formed by said volatile byproducts.

WO 2005/061 209 describes an article that is a precursor of a composite material comprising a thermoplastic polymer matrix and reinforcing fibers, in which the polymer matrix is itself in the form of yarns and/or fibers, so as to be able to form a composite material by melting of said precursor article, especially by thermocompression. This solution requires a prior co-mixing operation, which is often expensive, and this does not solve the problem of the compromise to be made between the viscosity of the thermoplastic resin and its molecular mass.

There is thus, firstly, a need for an improved process for manufacturing a composite material bearing a specific thermoplastic polymer matrix, in which process said thermoplastic polymer has a low melt viscosity during the fiber impregnation step despite a high molecular mass Mn which may be, for example, from 15 000 to 40 000, preferably from 15 000 to 30 000, while at the same time allowing a short production cycle, i.e. less than 30 minutes and more particularly less than 3 minutes and thus high productivity suited to the mass production of composite parts of complex geometry. Said process also offers the technical advantages associated with the use of high molecular weight thermoplastic polymers, which are particularly advantaged by virtue of their structure in terms of mechanical performance, lightness (especially in the case of polyamides) and recyclability. These last two environmental constraints are increasingly imposed in a context of energy saving and durable development.

More particularly, the challenge with which the present invention is faced is that of finding a technical solution that is a compromise between good impregnation of the reinforcing fibers with a specific thermoplastic matrix, which has a low viscosity on impregnation in bulk melt form and a high molecular mass, thus allowing easier use of fibrous preimpregnates that can be more readily consolidated at low pressure and thus only requiring low-pressure molding systems or techniques, with molds that are less expensive, for the manufacture of large-sized composite parts, via standard techniques under reduced pressure, for instance RTM, compression injection molding or infusion, under reduced pressure.

More particularly, said polymer has a glass transition temperature that may be less than or equal to 75° C. for a semicrystalline polymer with a Tm ranging from 150° C. to less than 250° C. or a Tg of greater than 75° C., preferably at least 80° C. The latter particular case with a particular Tg of greater than 75° C., in addition to the mentioned advantages, makes it possible to ensure high mechanical performance, in particular at elevated temperature. In particular, the use of said polymer according to the invention must be compatible with a technique for manufacturing said composite in a closed mold such as RTM (resin transfer molding) or S-RIM (structural RIM or structural reaction injection molding) or compression injection molding or infusion, in particular under reduced pressure, in particular with the absence of any byproduct to be removed or present as residue from the preparation of said polymer.

Patent application WO 2013/060 976 from the Applicant already describes a process with impregnation of said fibrous assembly starting with the precursor reactive composition of said polymer and without any description or suggestion of use of said polymer as derived from said reactive composition, as polymer for impregnation in bulk melt form of said assembly of fibers. What is surprising is that said specific polymer derived from the chain extension of a prepolymer of said polymer with a reactive extender itself has a lower viscosity than a polymer and in particular a polyamide of the same molecular mass Mn but without said extender incorporated into its structure, thus allowing the easier use of fibrous preimpregnates that may be consolidated more readily at low pressure and thus only requiring low-pressure molding systems, with less expensive molds for the manufacture of large-sized parts, via standard techniques such as RTM, compression injection molding or infusion, under reduced pressure.

More particularly, the process of the present invention allows very good impregnation of reinforcing fibers using a low-viscosity thermoplastic polymer derived from a specific precursor reactive composition, whilst already having a controlled high molecular mass before impregnation. The use of such a polymer allows good impregnation of the reinforcing fibers and consequently the targeted high mechanical performance. More particularly, for a Tg of greater than 75° C. and preferably of at least 80° C., more preferentially of at least 90° C., even more preferentially of at least 100° C., said polymer allows mechanical strength at high temperature, i.e. creep strength and in particular with mechanical performance, in terms of modulus of rupture and breaking stress, which change little up to a temperature of at least 90° C. and preferably up to at least 100° C. This good compromise between good impregnation of the fibers and high mechanical performance, which in particular are stable at high temperature for a targeted high specific Tg, is made possible by the direct use of said thermoplastic polymer obtained via the polymerization reaction by polyaddition of a precursor reactive composition of said thermoplastic polymer, said reactive composition comprising prepolymers a) bearing identical reactive functions, of low molecular mass Mn not higher than 10 000 and chain extenders b) bearing functions that are co-reactive with the functions of said prepolymers a). These extenders and prepolymers are specifically selected to avoid the formation and removal of the gaseous or volatile byproducts under the conditions of preparation of said polymer and thus to avoid the formation of microbubbles in said polymer and consequently in the final composite material, as occurs in a polymerization reaction by (poly)condensation, which is by definition excluded for the production of the polymer of the present invention.

By performing such a process, excellent cohesion of the composite material and optimum transmission of the forces to the reinforcing fibers and high mechanical performance are obtained. More particularly, when said polymer is chosen with a Tg of greater than 75° C., preferably of at least 80° C. and more preferentially of at least 100° C., it is adapted for use at high temperature, in particular with mechanical performance qualities that change little in terms of modulus of rupture and breaking stress up to a temperature of at least 90° C., preferably of at least 100° C.

The invention also allows the use of forming techniques that are generally reserved for thermosetting polymers, at the very least in the field of composites. In accordance with the invention, a composite part bearing a thermoplastic matrix may thus be manufactured by structured reaction injection molding (SRIM) or by compression injection molding or by infusion or by RTM, in particular under reduced pressure.

The first subject of the invention thus concerns a process for manufacturing a composite material comprising an assembly of one or more synthetic or natural, preferably long reinforcing fibers, the assembly melt-impregnated with at least one thermoplastic polymer as matrix, preferably having a glass transition temperature Tg of less than or equal to 75° C. and a Tm ranging from 150° C. to less than 250° C. or a Tg of greater than 75° C. and preferably of at least 80° C., more preferentially from 100 to 200° C., even more preferentially from 110 to 200° C., in particular from 110° C. to less than 180° C. and even more particularly from 120° C. to 170° C., said process comprising:

i) a step of impregnating said assembly in bulk melt form with at least one thermoplastic polymer, in particular having a viscosity at the impregnation temperature in bulk melt form not exceeding 200 Pa·s, preferably not exceeding 150 Pa·s, with said at least one polymer being the product of polymerization by polyaddition reaction of a reactive precursor composition comprising:
  a) at least one prepolymer P(X)n of said thermoplastic polymer, comprising a hydrocarbon-based molecular chain P and bearing at its ends n identical reactive functions X, with X being a reactive function from among: OH, $NH_2$ or COOH, with n ranging from 1 to 3, preferably n being 1 or 2, more preferentially 2, said prepolymer preferably having a semi-aromatic and/or semi-cycloaliphatic structure and in particular a number-average molecular mass Mn ranging from 500 to 10 000, preferably 1000 to 10 000, more preferentially from 1000 to 6000 and even more preferentially from 2000 to 6000 $g \cdot mol^{-1}$
  b) at least one chain extender, represented by Y-A-Y, comprising two identical functions Y that are reactive with at least one of said functions X of said prepolymer a), with A being a covalent single bond bonding the two functions Y or a non-polymeric hydrocarbon-based diradical, said extender preferably having Y chosen from: oxazine, oxazoline, oxazolinone, oxazinone, imidazoline, epoxy, isocyanate, maleimide, cyclic anhydride or aziridine, preferably oxazoline or oxazine, and a molecular mass of less than 500, in particular less than 400
ii) a step of cooling and obtaining a fibrous preimpregnate
iii) a step of processing and final forming of said composite material.

More particularly, said thermoplastic polymer is obtained by polymerization of a precursor reactive composition comprising a prepolymer of said impregnation polymer, chosen from: a polyamide, a polyester, copolymers thereof including polyamide-polyethers or mixtures thereof and preferably a polyamide.

Said prepolymer a) P(X)n in particular corresponds to n=1 or 2, preferably n=2 and to X a reactive function chosen from: OH, $NH_2$ and COOH, preferably $NH_2$ or COOH with said hydrocarbon-based molecular chain P being of semi-cycloaliphatic or semi-aromatic structure with said polymer having a Tg of greater than 75° C., preferably of at least 80° C. and more preferentially of at least 90° C. The term "semi-cycloaliphatic" means for the polymer or prepolymer according to the invention that said polymer or prepolymer comprises in its units a cycloaliphatic structure preferably with at least 25 mol % of its units comprising said cycloaliphatic structure. A semi-aromatic structure may be defined similarly.

The term "semi-crystalline" means for the thermoplastic polymer of the invention a polymer which has a melting peak corresponding to a melting point Tm, measured by DSC according to methods indicated below. The molecular mass Mn, the glass transition temperature Tg and, depending on the case, the melting point Tm or the crystallization temperature Tc and the melt viscosity or the inherent viscosity values are determined, unless specifically mentioned otherwise, according to the methods indicated on page 36 of WO 2013/060 476 and more precisely as follows hereinbelow.

The melt viscosity of the polymer or prepolymer or of the precursor composition is measured according to the reference manual of the constructor of the measuring instrument used, which is a Physica MCR301 Rheometer, under nitrogen flushing at the temperature given under a shear of 100 $s^{-1}$, between two parallel planes 50 mm in diameter.

The Mn of the prepolymer or of the thermoplastic polymer is determined from titration (assay) of the end functions X according to a potentiometric method (back-assay of a reagent in excess relative to the OH end functions and direct assay for $NH_2$ or carboxyl) and from the theoretical functionality n calc (versus X) calculated from the material balance and from the functionality of the reactants.

Measurement of the intrinsic or inherent viscosity is performed in m-cresol. The method is well known to those skilled in the art. Standard ISO 937 is followed, but with the solvent being changed (use of m-cresol instead of sulfuric acid, and the temperature being 20° C.).

The glass transition temperature Tg of the thermoplastic polymers used or of the polymer fibers (Tg') used is measured using a differential scanning calorimeter (DSC), after a second heating cycle, according to standard ISO 11357-2. The heating and cooling rate is 20° C./min.

The melting point Tm and the crystallization temperature Tc are measured by DSC, after a first heating, according to standard ISO 11357-3. The heating and cooling rate is 20° C./min.

According to a more particular option of the process of the invention, said thermoplastic polymer is obtained from a precursor composition comprising an extender b) with said function Y being chosen from the following relative to the function X of said prepolymer:

for X being $NH_2$ or OH, in particular $NH_2$:
  Y chosen from the following groups: maleimide, optionally blocked isocyanate, oxazinone and oxazolinone, cyclic anhydride, epoxide, preferably oxazinone and oxazolinone and when X is COOH:
  Y chosen from the following groups: oxazoline, oxazine, imidazoline or aziridine, such as 1,1'-iso- or terephthaloyl-bis(2-methylaziridine), preferably oxazoline.

According to another option, said polymer is semi-crystalline with a Tg of less than 75° C. and a melting point Tm ranging from 150° C. to less than 250° C., said polymer and its prepolymer a) as defined above preferably possibly being based on a polyamide PA6, PA11, PA12, PA 6.10, PA6.12, PA10.10, PA10.12.

As regards said extenders b) that are suitable for obtaining said polymer used in the impregnation step i), mention may be made, as examples of chain extenders with reactive functions Y, of oxazoline or oxazine, which are suitable for the use of the polymer used in the process of the invention. Reference may be made to those described under the references A, B, C and D on page 7 of patent application EP 0 581 642 from the Applicant and also to the processes for preparing same and to the reaction methods presented therein. A is bisoxazoline, B is bisoxazine, C is 1,3-phenylene bisoxazoline and D is 1,4-phenylene bisoxazoline.

As examples of chain extenders bearing an imidazoline reactive function Y that are suitable for use, reference may be made to those described (A to F) on pages 7 to 8 and table 1 on page 10 of patent application EP 0 739 924 from the Applicant, and also to the processes for preparing same and the reaction methods presented therein.

As examples of chain extenders bearing a reactive function Y=oxazinone or oxazolinone, reference may be made to those described under references A to D on pages 7 to 8 of patent application EP 0 581 641 from the Applicant, and also to the processes for preparing same and the reaction methods presented therein.

As examples of oxazinone (6-atom ring) and oxazolinone (5-atom ring) groups Y that are suitable for use, mention may be made of the groups Y derived from: benzoxazinone, from oxazinone or from oxazolinone, with A possibly being a covalent single bond with respective corresponding extenders being: bis(benzoxazinone), bisoxazinone and bisoxazolinone.

A may also be a $C_1$ to $C_{14}$, preferably $C_2$ to $C_{10}$, alkylene, but preferably A is an arylene and more particularly it may be a phenylene (substituted with Y in positions 1,2 or 1,3 or 1,4) or a naphthalene radical (disubstituted with Y) or a phthaloyl (iso- or terephthaloyl) or A may be a cycloalkylene.

For the functions Y such as oxazine (6-membered ring), oxazoline (5-membered ring) and imidazoline (5-membered ring), the radical A may be as described above with A possibly being a covalent single bond and with the respective corresponding extenders being: bisoxazine, bisoxazoline and bisimidazoline. A may also be a $C_1$ to $C_{14}$, preferably $C_2$ to $C_{10}$, alkylene. The radical A is preferably an arylene and more particularly it may be a phenylene (substituted with Y in positions 1,2 or 1,3 or 1,4) or a naphthalene radical (disubstituted with Y) or a phthaloyl (iso- or terephthaloyl) or A may be a cycloalkylene.

The presence of a catalyst for the reaction between the prepolymer P(X)n and the extender Y-A-Y in a content ranging from 0.001% to 2%, preferably from 0.01% to 0.5%, relative to the total weight of the two co-reactants mentioned, can accelerate the (poly)addition reaction and thus shorten the polyaddition reaction for obtaining said polymer. Such a catalyst may be chosen from: 4,4'-dimethylaminopyridine, p-toluenesulfonic acid, phosphoric acid, NaOH and optionally those described for a polycondensation or transesterification as described in EP 0 425 341, page 9, lines 1 to 7.

More particularly, said extender corresponds to Y chosen from oxazinone, oxazolinone, oxazine, oxazoline and imidazoline, preferably oxazoline, and A representing a covalent single bond between the two functions Y or an alkylene —$(CH_2)_m$— with m ranging from 1 to 14 and preferably from 2 to 10 or A representing cycloalkylene or an alkyl-substituted or unsubstituted arylene, in particular benzenic arylenes, chosen from o-, m- or p-phenylenes or naphthalenic arylenes, A preferably being a cycloalkylene or an arylene or A being a covalent single bond between the two functions Y.

According to a particularly preferred option, the weight content of said extender in said thermoplastic polymer ranges from 1% to 20% and preferably from 5% to 20% by weight. This content is the content of extender chemically incorporated by polyaddition with said prepolymer in said polymer used for the melt impregnation of said fiber assembly.

A chain of said polymer may comprise and preferably comprises at least two chains of said prepolymer a) linked together via an extender molecule b) and more particularly the number of prepolymer chains a) per chain of said polymer may range from 2 to 80 and preferably from 2 to 50. The Mn of said polymer may range from 12 000 to 40 000, preferably from 12 000 to 30 000.

More preferably, said prepolymer a) bears a function X=carboxyl with n=2 (±0.1) and said extender b) bears a function Y=oxazoline.

In this case, said thermoplastic polymer has a repeating unit structure according to formula (I) below:

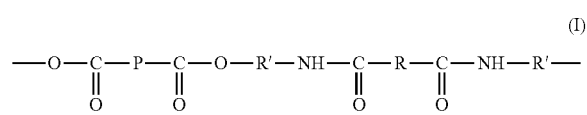

with R=A with A being as defined above according to the invention for said extender Y-A-Y and chosen from a covalent single bond or a diradical of an optionally substituted aliphatic or cycloaliphatic or aromatic hydrocarbon-based chain, R' being an optionally substituted aliphatic or cycloaliphatic or aromatic hydrocarbon-based chain in which the shortest chain linking the neighboring —O— and —NH— units comprises 2 or 3 carbon atoms, P being the chain of said prepolymer a) bearing functions X=carboxyl.

Preferably, in the structure of said polymer, the extender b) is between two prepolymer chains a) and not at the ends. This means that said polymer is obtained with a molar excess of the prepolymer a) relative to said extender b) and of the functions X relative to the functions Y.

Even more particularly, in these last two cases, said extender is chosen from: phenylene-bis-oxazolines, preferably 1,3-phenylenebis(2-oxazoline) and 1,4-phenylenebis (2-oxazoline).

As regards said polymer, it is preferably a polyamide which is the product of reaction of a polyamide prepolymer a) with an extender b) as defined above. In this particular case, said prepolymer a) is a polyamide prepolymer obtained from: the polycondensation of at least one linear or branched aliphatic diamine and of at least one aromatic and/or cycloaliphatic dicarboxylic acid comprising at least one optionally substituted ring of 4, 5 or 6 carbon atoms and/or the polycondensation of at least one cycloaliphatic diamine with at least one linear or branched aliphatic, cycloaliphatic or aromatic dicarboxylic acid and optionally with the presence of at least one compound chosen from: a lactam, an aminocarboxylic acid or the stoichiometric combination of an aliphatic dicarboxylic acid and an aliphatic diamine.

According to a particular option of the process of the invention, said thermoplastic polymer is a polyamide which may be a semi-aromatic and/or semi-cycloaliphatic homopolyamide or copolyamide, more particularly corresponding to one of the following formulae: polyamides from among: 8.T, 9.T, 10.T, 11.T, 12.T, 6.T/9.T, 9.T/10.T, 9.T/ 11.T, 9.T/12.T, 9/6.T, 10/6.T, 11/6.T, 12/6.T, 10/9.T, 10/10.T, 10/11.T, 10/12.T, 11/9.T, 11/10.T, 11/11.T, 11/12.T, 12/9.T, 12/10.T, 12/11.T, 12/12.T, 6.10/6.T, 6.12/6.T, 9.10/6.T, 9.12/6.T, 10.10/6.T, 10.12/6.T, 6.10/9.T, 6.12/9.T, 9.10/9.T, 9.12/9.T, 10.10/9.T, 10.12/9.T, 6.10/10.T, 6.12/10.T, 9.10/10.T, 9.12/10.T, 10.10/10.T, 10.12/10.T, 6.10/12.T, 6.12/12.T, 9.10/12.T, 9.12/12.T, 10.10/12.T, 11/6.T/9.T, 11/6.T/10.T, 11/6.T/11.T, 11/6.T/12.T, 11/9.T/10.T, 11/9.T/11.T, 11/9.T/12.T, 11/10.T/11.T, 11/10.T/12.T, 11/11.T/12.T, 6.T/10.T, 6.T/11.T, 6.T/12.T, 10.T/11.T, 10.T/12.T, 11.T/12.T, 12/6.T/10.T, 12/6.T/11.T, 12/6.T/12.T, 12/9.T/10.T, 12/9.T/11.T, 12/9.T/12.T, 12/10.T/11.T, 12/10.T/12.T, 12/11.T/12.T or preceding terpolymer polyamides with 12/replaced with 9/, 10/, 6.10/, 6.12/, 10.10/, 10.12/, 9.10/and 9.12/or all the polyamides mentioned above in which terephthalic (T) is partially or totally replaced with isophthalic (I), naphthalene-2,6-dicarboxylic and/or with 1,3- or 1,4-CHDA (cyclohexanedicarboxylic acid), with all or some of the aliphatic diamines possibly being replaced with cycloaliphatic diamines or all the polyamides mentioned above, with replacement of the $C_6$ to $C_{12}$ aliphatic diamine with a cycloaliphatic diamine from among BMACM (bis(3-methyl-4-aminocyclohexyl)methane), BACM (bis(aminocyclohexyl)methane) and/or IPDA (isophorone diamine) and with replacement of all or some of the aromatic diacid T with a linear or branched $C_6$ to $C_{18}$ aliphatic diacid.

It is obvious that it is indeed the polyamide structure of said prepolymer a) incorporated into said polymer via the polyaddition reaction which gives said polyamide said structure mentioned above. The structure of said elongated or chain-extended polyamide comprises a chain extender located between two chains of polyamide prepolymers a). Consequently, the structure mentioned above corresponds perfectly to that of said polyamide prepolymer a) used for preparing said polyamide of higher molecular mass and this is how it should be interpreted.

According to a more particular variant of the process, said thermoplastic polymer is a semi-crystalline polyamide. Still, this polyamide structure encompasses the structure of said prepolymer a), with an extender b) being located between two chains of prepolymers a). It is this overall structure of the polymer that is semi-crystalline. In this case, the polyamide prepolymer a) is or may also be semi-crystalline.

The semi-crystalline structure is characterized by a melting point Tm and a crystallization temperature Tc that may be measured by DSC according to the methods indicated above (according to the description on page 6 of WO 2013/060 976).

According to a particular option of said process of the invention, it may comprise a step i') prior to the impregnation step i), of preparation of said polymer by polyaddition reaction in said precursor reactive composition between said prepolymer a) and said extender b), said reaction preferably being performed in bulk in melt form in an extruder transferring on-line said molten polymer onto said assembly of fibers for said impregnation step i).

As regards the impregnation step i), it may be performed in a mold for the final processing of said composite material, in particular by transfer of said molten polymer onto said assembly of fibers. Otherwise, the impregnation step i) may also be performed outside the mold for final processing of said composite material.

Said melt impregnation step i) may also comprise a prior step of sprinkling said assembly of fibers with said polymer in powder form, followed by a step of heating and melting of said powder and optionally a step of calendering, thus making it possible to obtain a preimpregnated fibrous material as intermediate product in step ii), before said final processing step iii).

As regards said processing step iii), it may be performed in a closed mold with molding by resin transfer (RTM), structured reaction injection molding (S-RIM) or infusion molding or compression injection molding, in particular under reduced pressure. Said processing step iii) may also be performed in an open mold by pultrusion through a heating die, with optional additional transformation of the semi-finished products obtained. In particular, an processing may be performed by superposition of unidirectional (UD) strips obtained via the AFP technique (automatic fiber placement) or by thermocompression and more particularly by AFP comprising heating by laser, with said polymer used comprising, via the precursor reactive composition, specific additives that absorb at the wavelength of a laser, in particular a UV or IR laser, when the UD strips are based on glass or carbon fibers.

In the case where step i) of impregnation of said assembly of fibers is performed in a mold, said assembly of fibers may be in the form of a preform placed in said mold. Preferably, the fibers of said preform are linked via a polymer that is identical to the impregnation polymer or different from said polymer but compatible with said impregnation polymer. A polymer linking said preform that is at least partially miscible with said impregnation polymer is considered as being compatible.

Said fibers may be natural, i.e. fibers of plant or animal origin and also man-made synthetic fibers. As preferred natural fibers of plant origin, mention may be made of flax fibers. Synthetic fibers are even more preferred and are chosen from carbon, glass, ceramic and aramid fibers. The preferred fibers are long fibers chosen from carbon, glass, ceramic and aramid fibers.

Said fibers are in particular long fibers of L/D>1000 and preferably >2000.

Said impregnation polymer as polymer matrix may comprise carbon-based fillers in dispersed form, in particular carbon black or carbon-based nanofillers, preferably carbon-based nanofillers, from among graphenes and/or carbon nanotubes and/or carbon nanofibrils, or mixtures thereof.

More particularly, the presence of such fillers or of such additives in said impregnation polymer, either at the start or by addition in molten form, makes it possible to make the matrix of said composite material conductive, allowing particular applications requiring the removal and prevention of electrostatic charges or for allowing, during the processing of the composite material, uniform and homogeneous heating via the induction technique.

According to another option, said process according to the invention comprises an processing step performed by thermocompression of preimpregnates under reduced pressure, in particular according to the vacuum bagging technique.

The composite material, which may be obtained via the process of the invention, may be in the form of a composite part or article, for applications in the aeronautics, motor vehicle, railway, road transport, wind power, photovoltaic, nautical, sports and leisure, building, civil engineering, electrical or electronics field.

More particularly, this may concern the manufacture of profiled reinforcements, hulls such as a boat hull, panels, including sandwich panels, composite tanks such as a motor vehicle tank, composite pipeworks such as pumping tubes and petroleum or gas transportation pipes, hollow bodies, aeroplane wings, an aeroplane fuselage, a girder or partition in a house or a boat, a spar, a spoiler, a motor vehicle casing, a brake disk, a jack or steering wheel body, a motor vehicle bodywork, a carriage, a shoe sole or a golf stick.

The present invention also and in particular covers the use of a polymer as defined above, in particular a polyamide, as polymer for the bulk melt impregnation of an assembly of one or more synthetic or natural reinforcing fibers, for the manufacture of a preimpregnated fibrous material or of a final part made of composite material.

More particularly, this use concerns the manufacture of a composite part, in particular a mechanical or structural part, in the aeronautics, motor vehicle, railway, road transport, wind power, photovoltaic, nautical, sports and leisure, building or civil engineering, electrical or electronics field.

The examples that follow are presented to illustrate the invention and its performance qualities and do not in any way limit its scope.

Methods for Determining the Characteristics Mentioned

The melt viscosity of the prepolymer or of the precursor composition is measured according to the reference manual of the constructor of the measuring instrument used, which is a Physica MCR301 Rheometer, under nitrogen flushing at the temperature given under a shear of 100 s$^{-1}$, between two parallel planes 50 mm in diameter.

The Mn of the prepolymer or the thermoplastic polymer is determined by potentiometry, size exclusion chromatography as PMMA equivalents or by NMR, depending on the indication.

The measurement of the intrinsic or inherent viscosity is performed in m-cresol. The method is well known to those skilled in the art. Standard ISO 937 is followed, but with the solvent being changed (use of m-cresol instead of sulfuric acid, and The glass transition temperature Tg of the thermoplastic polymers used is measured using a differential scanning calorimeter (DSC), after a second heating cycle, according to standard ISO 11357-2. The heating and cooling rate is 20° C./min.

The melting point Tm and the crystallization temperature Tc are measured by DSC, after a first heating, according to standard ISO 11357-3. The heating and cooling rate is 20° C./min.

The enthalpy of crystallization of said matrix polymer is measured by differential scanning calorimetry (DSC) according to standard ISO 11357-3.

EXAMPLES

A Preparation of a Polyamide Polymer by Chain Extension of a Reactive Prepolymer (or Oliciomer)

A-1 Preparation of the Reactive Prepolymer P(X)n

This procedure is representative of all the types of polyamide prepolymers according to the invention.

5 kg of the following starting materials are placed in a 14-liter autoclave reactor:
500 g of water,
the diamines,
the amino acids or lactams,
the diacids,
35 g of sodium hypophosphite in solution,
0.1 g of a Wacker AK1000 antifoam (the company Wacker Silicones).

The nature and molar ratios of the molecular units and structures of the reactive prepolymer polyamides (by reference test) are given in table 1 below.

The closed reactor is purged of its residual oxygen and then heated to a temperature of 230° C. of the material. After stirring for 30 minutes under these conditions, the pressurized vapor that has formed in the reactor is gradually pressure-reduced over the course of 60 minutes, while at the same time gradually increasing the temperature of the material such that it becomes established at a minimum of Tm+10° C. at atmospheric pressure for the semi-crystalline polymers of Tm>230° C., or 250° C. for the other polymers.

The oligomer (prepolymer) is then emptied out by the bottom valve and then cooled in a water bath and then ground.

The characteristics are presented in Table 1 below.

TABLE 1

Characteristics of the prepolymers prepared

| Ref | Molecular structure and molar composition (%) | Monomers used | X | Tm (° C.) | Tg (° C.) | Tc (° C.) | ΔH (J/g) | Acid number meq/kg (*) | Mn potentiometry g/mol |
|---|---|---|---|---|---|---|---|---|---|
| Prep. 1 | 11 | Aminoundecanoic acid Adipic acid (1 molecule per chain) | COOH | 178.8 | 43.2 | 155 | 75 | 809 | 2473 |
| Prep. 2 | 6I/10I (30/70) | hexamethylenediamine decanediamine isophthalic acid | COOH | () | 94.5 | () | (**) | 900 | 2222 |
| Prep. 3 | MXDT/10T (41.2/58.8) | m-xylylenediamine decanediamine terephthalic acid | COOH | 270.3 | 119.4 | 240.8 | 50.1 | 621 | 3221 |

(*): Milliequivalents per kilogram
(**): Amorphous polymer

A-2 Preparation of the Polyamide Polymer E by Chain Extension with an Extender of Y-A-Y Type 10 g of the dried and ground above prepolymer are mixed with a stoichiometric amount of 1,3-phenylenebis(2-oxazoline) (PBO).

The mixture is introduced under nitrogen flushing into a DSM brand co-rotating conical screw microextruder (15 ml volume) preheated to a temperature T1 equal to 200° C. for prep. 1 and 2 and T1: 280° C. for prep. 3, with rotation of the screws at 100 rpm. The mixture is left to recirculate in the microextruder and the increase in viscosity is monitored by measuring the normal force. After approximately 2 minutes, a plateau is reached and the contents of the microextruder are emptied out in the form of a rod. The air-cooled product is formed into granules.

TABLE 2

Analytical characteristics of the polyamides E obtained with chain extension

| Ref | Prepolymer | $T_1$ (° C.) | Tm (° C.) | Tg (° C.) | Tc (° C.) | ΔH (J/g) | Mn 1 (determined by size exclusion chromatography in PMMA equivalent) (g/mol) |
|---|---|---|---|---|---|---|---|
| E1 | According to the invention Prep. 1 | 200 | 174.7 | 34 | 142.8 | 57 | 28100 |
| E2 | According to the invention Prep. 2 | 200 | (*) | 110 | (*) | (*) | 28500 |
| E3 | According to the invention Prep. 3 | 280 | 273 | 135 | 230.5 | 36 | 9900 |

(*) Amorphous polymer

A-3 Preparation of the Comparative Polyamides PA without Chain Extender

The comparative polyamides free of chain extenders are synthesized according to a procedure identical to that for the reactive prepolymers P(X)n with this procedure being representative of all the comparative polyamides prepared, except that the molar mass Mn of the comparative polymer is adjusted with a smaller excess of diacid than that with the corresponding prepolymer, according to the method that is well known to those skilled in the art.

The characteristics of these comparative polyamides CE are presented in Table 3 below.

TABLE 3

Analytical characteristics of the comparative polyamides CE free of chain extenders

| Ref | Molecular structure and molar composition | Monomers used | Tm (° C.) | Tg (° C.) | Tc (° C.) | ΔH (J/g) | Mn 1 (determined by size exclusion chromatography in PMMA equivalent) (g/mol) |
|---|---|---|---|---|---|---|---|
| CE1 | 11 (100) | Aminoundecanoic acid Adipic acid (1 molecule per chain) | 188.5 | 47.3 | 158.4 | 72.4 | 28250 |
| CE2 | 6I/10I (30/70) | hexamethylenediamine decanediamine isophthalic acid | (*) | 108.3 | (*) | (*) | 28540 |
| CE3 | MXDT/10T (41.2/58.8) | m-xylylenediamine decanediamine terephthalic acid | 279.2 | 130.7 | 241.4 | 43.6 | 10000 |

(*) Amorphous polymer

A-4 Comparison of the Melt Viscosities of the PAs According to the Invention E and the Comparative PAs CE The viscosities of the polymers according to the invention CE and of the comparative polyamides free of chain extenders CE are reported in Tables 4 to 6 below:

TABLE 4

Viscosities of the polyamides E1 of the invention and comparative CE1 (PA 11 base)

| T (° C.) | Viscosity E1 (Pa · s) | Viscosity CE1 (Pa · s) |
|---|---|---|
| 200 | 756.4 | 751.2 |
| 225 | 128.2 | 340.6 |
| 250 | 22.51 | 166.5 |
| 275 | 5.72 | 86.9 |
| 300 | 1.75 | 48 |

These results are represented in FIG. 1.

TABLE 5

Viscosities of tests E3 and CE3 (amorphous PA 6I/10I base)

| T (° C.) | Viscosity E2 (Pa · s) | Viscosity CE2 (Pa · s) |
|---|---|---|
| 200 | 42080 | 42150 |
| 250 | 423 | 12600 |

TABLE 6

Viscosities of tests E4 and CE4 (PA MXDT/10T base)

| T (° C.) | Viscosity E4 (Pa · s) | Viscosity CE4 (Pa · s) |
|---|---|---|
| 280 | 187 | 189 |
| 300 | 46.2 | 126 |

The results clearly show that the melt viscosities of the PAs according to the invention are lower than those of the comparative PAs for temperatures $T>T_1$ with a difference that increases as the temperature increases.

The invention claimed is:
1. A process for manufacturing a composite material comprising an assembly of one or more synthetic or natural reinforcing fibers, melt-impregnated with at least one thermoplastic polymer as matrix, having a glass transition temperature Tg of less than or equal to 75° C. and a melting point (Tm) ranging from 150° C. to less than 250° C. or a Tg of greater than 75° C., said process comprising:
i) a step of impregnating said assembly in bulk melt form with at least one thermoplastic polymer, having a viscosity at the impregnation temperature in bulk melt form not exceeding 200 Pa·s, with said at least one polymer being the product of polymerization by polyaddition reaction of a reactive precursor composition comprising:
a) at least one prepolymer P(X)n of said thermoplastic polymer, comprising a hydrocarbon-based molecular chain P and bearing at its ends n identical reactive functions X, with X being a reactive function from among: OH, $NH_2$ or COOH, with n ranging from 1 to 3, and a number-average molecular mass Mn ranging from 500 to 10,000 g·mol$^{-1}$,
b) at least one chain extender, represented by Y-A-Y, comprising two identical functions Y that are reactive with at least one of said functions X of said prepolymer a), with A being a covalent single bond bonding the two functions Y or a non-polymeric hydrocarbon-based diradical,
ii) a step of cooling and obtaining a fibrous preimpregnate,
iii) a step of processing and final forming of said composite material.

2. The process as claimed in claim 1, wherein the thermoplastic polymer is obtained by polymerization of a precursor reactive composition comprising a prepolymer of said impregnation polymer, chosen from: a polyamide, a polyester, copolymers thereof including polyamide-polyethers or mixtures thereof.

3. The process as claimed in claim 1, wherein:
the prepolymer P(X)n corresponds to n=1 or 2,
X is a reactive function chosen from: OH, $NH_2$, COOH,
said hydrocarbon-based molecular chain P has a semi-cycloaliphatic or semi-aromatic structure and
said polymer has a Tg of greater than 75° C.

4. The process as claimed in claim 1, wherein the thermoplastic polymer is obtained from a precursor composition comprising an extender b) with said function Y being chosen from the following relative to the function X of said prepolymer:
for X being $NH_2$ or OH:
Y chosen from the following groups: maleimide, optionally blocked isocyanate, oxazinone and oxazolinone, cyclic anhydride, epoxide,
and
when X is COOH:
Y chosen from the following groups: oxazoline, oxazine, imidazoline or aziridine, such as 1,1'-iso- or terephthaloyl-bis(2-methylaziridine).

5. The process as claimed in claim 1, wherein when Y is chosen from oxazinone, oxazolinone, oxazine, oxazoline and imidazoline, and A represents a covalent single bond between the two functions Y or an alkylene —$(CH_2)_m$- with m ranging from 1 to 14 and or A represents a cycloalkylene or an alkyl-substituted or unsubstituted arylene, from among o-, m- or p-phenylenes or naphthalenic arylenes.

6. The process as claimed in claim 1, wherein the weight content of said extender in said thermoplastic polymer ranges from 1% to 20%.

7. The process as claimed in claim 1, wherein a chain of said polymer comprises at least two chains of said prepolymer a) linked together via an extender molecule b), the number of prepolymer chains a) per chain of said polymer ranging from 2 to 80.

8. The process as claimed in claim 1, wherein the polymer is semi-crystalline with a Tg of less than 75° C. and a melting point Tm ranging from 150° C. to less than 250° C.

9. The process as claimed in claim 1, wherein the prepolymer a) bears a function X=carboxyl with n=2 (±0.1) and in that said extender bears a function Y=oxazoline.

10. The process as claimed in claim 9, wherein the thermoplastic polymer has a repeating unit structure according to formula (I) below:

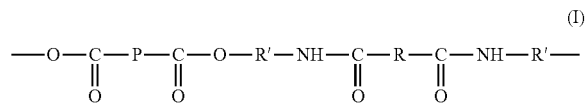

with R=A with A being as defined above and chosen from a covalent single bond or a diradical of an optionally substituted aliphatic or cycloaliphatic or aromatic hydrocarbon-based chain,
R' being an optionally substituted aliphatic or cycloaliphatic or aromatic hydrocarbon-based chain in which the shortest chain linking the neighboring —O— and —NH— units comprises 2 or 3 carbon atoms,
P being the chain of said prepolymer a) bearing functions X=carboxyl.

11. The process as claimed in claim 9, wherein the extender is chosen from: phenylene-bis-oxazolines.

12. The process as claimed in claim 1, wherein the prepolymer a) is a polyamide prepolymer obtained from: the polycondensation of at least one linear or branched aliphatic diamine and of at least one aromatic and/or cycloaliphatic dicarboxylic acid comprising at least one optionally substituted ring of 4, 5 or 6 carbon atoms and/or the polycondensation of at least one cycloaliphatic diamine with at least one linear or branched aliphatic, cycloaliphatic or aromatic dicarboxylic acid and optionally with the presence of at least one compound chosen from: a lactam, an aminocarboxylic acid or the stoichiometric combination of an aliphatic dicarboxylic acid and an aliphatic diamine.

13. The process as claimed in claim 1, wherein the thermoplastic polymer is a semi-aromatic and/or semi-cycloaliphatic homopolyamide or copolyamide polyamide, corresponding to one of the following formulae: polyamides from among: 8.T, 9.T, 10.T, 11.T, 12.T, 6.T/9.T, 9.T/10.T, 9.T/11.T, 9.T/12.T, 9/6.T, 10/6.T, 11/6.T, 12/6.T, 10/9.T, 10/10.T, 10/11.T, 10/12.T, 11/9.T, 11/10.T, 11/11.T, 11/12.T, 12/9.T, 12/10.T, 12/11.T, 12/12.T, 6.10/6.T, 6.12/6.T, 9.10/6.T, 9.12/6.T, 10.10/6.T, 10.12/6.T, 6.10/9.T, 6.12/9.T, 9.10/9.T, 9.12/9.T, 10.10/9.T, 10.12/9.T, 6.10/10.T, 6.12/10.T, 9.10/10.T, 9.12/10.T, 10.10/10.T, 10.12/10.T, 6.10/12.T, 6.12/12.T, 9.10/12.T, 9.12/12.T, 10.10/12.T, 11/6.T/9.T, 11/6.T/10.T, 11/6.T/11.T, 11/6.T/12.T, 11/9.T/10.T, 11/9.T/11.T, 11/9.T/12.T, 11/10.T/11.T, 11/10.T/12.T, 11/11.T/12.T, 6.T/10.T, 6.T/11.T, 6.T/12.T, 10.T/11.T, 10.T/12.T, 11.T/12.T, 12/6.T/10.T, 12/6.T/11.T, 12/6.T/12.T, 12/9.T/10.T, 12/9.T/11.T, 12/9.T/12.T, 12/10.T/11.T, 12/10.T/12.T, 12/11.T/12.T or preceding terpolymer polyamides with 12/replaced with 9/, 10/, 6.10/, 6.12/, 10.10/, 10.12/, 9.10/ and 9.12/or all the polyamides mentioned above in which terephthalic (T) is partially or totally replaced with isophthalic (I), naphthalene-2,6-dicarboxylic and/or with 1,3- or 1,4-CHDA (cyclohexanedicarboxylic acid), with all or some of the aliphatic diamines possibly being replaced with cycloaliphatic diamines or all the polyamides mentioned above, with replacement of the $C_6$ to $C_{12}$ aliphatic diamine with a cycloaliphatic diamine from among BMACM, BACM and/or IPDA and with replacement of all or some of the aromatic diacid T with a linear or branched $C_6$ to $C_{18}$ aliphatic diacid.

14. The process as claimed in claim 1, wherein the thermoplastic polymer is a semi-crystalline polyamide.

15. The process as claimed in claim 1, comprising a step i') prior to the impregnation step i), of preparation of said polymer by polyaddition reaction of said precursor reactive composition comprising said prepolymer a) and said extender b), said reaction being performed in bulk in melt form in an extruder transferring on-line said molten polymer onto said assembly of fibers for said impregnation step i).

16. The process as claimed in claim 1, wherein the impregnation step i) is performed in a mold for the final processing of said composite material.

17. The process as claimed in claim 1, wherein the impregnation step i) is performed outside the mold for the final processing of said composite material.

18. The process as claimed in claim 1, wherein the melt impregnation step i) comprises a prior step of sprinkling said assembly of fibers with said polymer in powder form, followed by a step of heating and melting of said powder and optionally a step of calendering, thus making it possible to obtain a preimpregnated fibrous material as intermediate product in step ii), before said final processing step iii).

19. The process as claimed in claim 16, wherein the processing step iii) is performed in a closed mold with molding by resin transfer (RTM), structured reaction injection molding (S-RIM) or infusion molding or compression injection molding.

20. The process as claimed in claim 1, wherein the processing step iii) is performed by thermocompression of preimpregnates under reduced pressure.

21. The process as claimed in claim 16, wherein the processing step iii) is performed in an open mold by pultrusion through a heating die, with optional additional transformation of the semi-finished products obtained.

22. The process as claimed in claim 16, wherein the assembly of fibers is in the form of a preform placed in said mold.

23. The process as claimed in claim 1, wherein the fibers are long fibers chosen from carbon, glass, ceramic and aramid fibers.

24. The process as claimed in claim 1, wherein the polymer matrix comprises carbon-based fillers in dispersed form.

25. The process as claimed in claim 1, wherein the composite material is in the form of a composite part or article, for applications in the aeronautics, motor vehicle, railway, road transport, wind power, photovoltaic, nautical, sports and leisure, building, civil engineering, electrical or electronics field.

* * * * *